United States Patent
Harada et al.

(10) Patent No.: US 11,362,578 B2
(45) Date of Patent: Jun. 14, 2022

(54) POWER CONVERSION APPARATUS

(71) Applicant: TOSHIBA MITSUBISHI-ELECTRIC INDUSTRIAL SYSTEMS CORPORATION, Chuo-ku (JP)

(72) Inventors: Shohei Harada, Chuo-ku (JP); Jumpei Isozaki, Chuo-ku (JP); Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 17/052,390

(22) PCT Filed: Aug. 29, 2018

(86) PCT No.: PCT/JP2018/031906
§ 371 (c)(1),
(2) Date: Nov. 2, 2020

(87) PCT Pub. No.: WO2020/044454
PCT Pub. Date: Mar. 5, 2020

(65) Prior Publication Data
US 2021/0234453 A1    Jul. 29, 2021

(51) Int. Cl.
*H02M 1/08* (2006.01)
*H02M 3/335* (2006.01)
*H02M 1/32* (2007.01)

(52) U.S. Cl.
CPC .............. *H02M 1/08* (2013.01); *H02M 1/32* (2013.01); *H02M 3/33523* (2013.01)

(58) Field of Classification Search
CPC ...... H02M 1/08; H02M 1/42; H02M 3/33523; H02M 1/0006; H02M 1/32; H02M 7/4835
See application file for complete search history.

(56) References Cited

U.S. PATENT DOCUMENTS 5,155,674 A * 10/1992 Tanoue ................ H02H 7/1227
                                                           361/91.7
2017/0126127 A1    5/2017 Koyanagi et al.
(Continued)

FOREIGN PATENT DOCUMENTS

EP    2 549 634 A1    1/2013
EP    3 309 950 A1    4/2018
(Continued)

OTHER PUBLICATIONS

International Search Report dated Nov. 20, 2018 in PCT/JP2018/031906 filed Aug. 29, 2018, 2 pages.
(Continued)

*Primary Examiner* — Kyle J Moody
(74) *Attorney, Agent, or Firm* — Oblon, McClelland, Maier & Neustadt, L.L.P.

(57) ABSTRACT

A power supply circuit is configured to convert a voltage of a second electricity storage element into a power supply voltage for a driving circuit, and a voltage detector is configured to detect the voltage of the second electricity storage element. A unit converter includes a first resistor connected to the second electricity storage element electrically in series between the terminals of a first electricity storage element, and a second resistor and a first switch connected electrically in series between the terminals of the second electricity storage element. The power supply circuit is configured to generate a control signal for controlling the first switch on and off based on the detection value from the voltage detector. The power supply circuit is further configured to sense an overloaded state of the second resistor based on the control signal.

6 Claims, 9 Drawing Sheets

(56) References Cited

U.S. PATENT DOCUMENTS

2018/0331682 A1* 11/2018 Duduman ............... H02M 3/07
2020/0328590 A1* 10/2020 Yu ........................ H02H 7/1252

FOREIGN PATENT DOCUMENTS

| JP | 2-26340 U | 2/1990 |
| JP | 2002-281737 A | 9/2002 |
| JP | 2011-193615 A | 9/2011 |
| JP | 2017-212837 A | 11/2017 |
| WO | WO 2016/002319 A1 | 1/2016 |

OTHER PUBLICATIONS

Japanese Notice of Reasons for Refusal dated Aug. 5, 2020 in Japanese Patent Application No. 2019-529269 filed Aug. 29, 2018, 21 pages (with English Translation).
International Preliminary Report on Patentability and Written Opinion dated Mar. 11, 2021 in PCT/JP2018/031906 (with unedited computer generated English translation), 23 pages.
Extended European Search Report dated Feb. 23, 2022, in Patent Application No. EP 18 93 1789.4.

* cited by examiner

POWER CONVERSION APPARATUS

TECHNICAL FIELD

The present invention relates to a power conversion apparatus, particularly to a power conversion apparatus including a self-feeding circuit which generates control power from a main circuit of the power conversion apparatus.

BACKGROUND ART

A power conversion apparatus is known which uses a self-feeding circuit to supply control power to a control circuit (e.g., a gate driving circuit) in the power conversion apparatus. The self-feeding circuit is configured to generate control power directly from a main circuit of the power conversion apparatus (see, for example, Japanese Patent Laying-Open No. 2017-212837 [PTL 1]).

As a high-capacity power conversion apparatus, a multi-level conversion device having a plurality of conversion devices whose outputs are connected in cascade has been proposed. Examples of such multilevel conversion devices include a modular multilevel conversion device (hereinafter referred to as an MMC). The MMC can be a high-voltage, high-capacity conversion device, and thus can be used for interconnection with a power system. The MMC is widely applied to, for example, high-voltage direct current (HVDC) transmission, back-to-back (BTB) asynchronous interconnection systems, frequency changers (FCs), static synchronous compensators (STATCOMs).

The MMC comprises an arm having a plurality of unit converters, called cells, connected in cascade. Each cell includes a main circuit having a plurality of semiconductor switches and a DC capacitor. By turning on and off the semiconductor switches, the cell outputs a voltage across the DC capacitor or a zero voltage. Each cell includes a self-feeding circuit for generating control power from the main circuit. Thus, in an application in which control power needs to be supplied to a high-potential portion, the dielectric voltage required for the control power can be significantly reduced.

CITATION LIST

Patent Literature

PTL 1: Japanese Patent Laying-Open No. 2017-212837

SUMMARY OF INVENTION

Technical Problem

In the above-described MMC, the self-feeding circuit includes a current limiting resistor and a capacitor connected electrically in series between the terminals of the DC capacitor of the main circuit, and a power supply circuit (DC-DC converter) to convert the voltage of this capacitor into a power supply voltage for a driving circuit. Between the terminals of the capacitor, a resistor and a switch are connected electrically in series.

During operation of the main circuit, the voltage of the DC capacitor is stepped down by the current limiting resistor, and the stepped-down voltage is applied to the capacitor. When the voltage of the capacitor becomes equal to or more than a preset threshold value to indicate that the capacitor is in an overcharged state, the switch is turned on so that the resistor is connected between the terminals of the capacitor, thereby stopping power feeding to the capacitor.

However, in the above-described circuit configuration, if the current limiting resistor is malfunctioning and reduces its resistance value, turning on the switch for preventing an overcharge of the capacitor may bring the resistor into an overloaded state and may thus cause an overheat of the resistor due to an excessive current flowing through the resistor. Therefore, a technique to sense an overloaded state of the resistor for preventing an overcharge is important.

The present invention has been made to solve the above-described problem. An object of the present invention is to provide a self-feeding circuit to generate control power from a main circuit in a power conversion apparatus, the self-feeding circuit being capable of sensing an overloaded state of a resistor for preventing an overcharge of a capacitor which stores power supplied from the main circuit.

Solution to Problem

According to an aspect of the present invention, a power conversion apparatus comprises: a power conversion device including at least one unit converter, and a control device configured to control the power conversion device. The unit converter device includes: a main circuit including a first electricity storage element and a plurality of switching elements, a driving circuit configured to drive the plurality of switching elements, and a self-feeding circuit configured to supply power from the first electricity storage element to the driving circuit. The self-feeding circuit includes: a second electricity storage element electrically connected between terminals of the first electricity storage element, a power supply circuit configured to convert a voltage of the second electricity storage element into a power supply voltage for the driving circuit, and a voltage detector configured to detect the voltage of the second electricity storage element. The unit converter further includes: a first resistor electrically connected to the second electricity storage element in series between the terminals of the first electricity storage element, a second resistor electrically connected between terminals of the second electricity storage element, and a first switch electrically connected to the second resistor in series between the terminals of the second electricity storage element. The power supply circuit includes: an overcharge preventing circuit configured to prevent an overcharge of the second electricity storage element by generating a control signal for controlling the first switch on and off based on a detection value from the voltage detector, and an overload sensing circuit configured to sense an overloaded state of the second resistor based on the control signal generated by the overcharge preventing circuit.

Advantageous Effects of Invention

The present invention provides a self-feeding circuit to generate control power from a main circuit in a power conversion apparatus, the self-feeding circuit being capable of sensing an overloaded state of a resistor for preventing an overcharge of a capacitor which stores power supplied from the main circuit.

BRIEF DESCRIPTION OF DRAWINGS

FIG. 2 is a circuit diagram showing a configuration example of a cell shown in

FIG. 1.

DESCRIPTION OF EMBODIMENTS

An embodiment of the present invention is hereinafter described in detail with reference to the drawings. Hereinafter, identical or corresponding parts in the drawings are identically denoted, and the redundant explanation for such parts is not basically repeated.

(Configuration of Power Conversion Apparatus)

Figure 1:
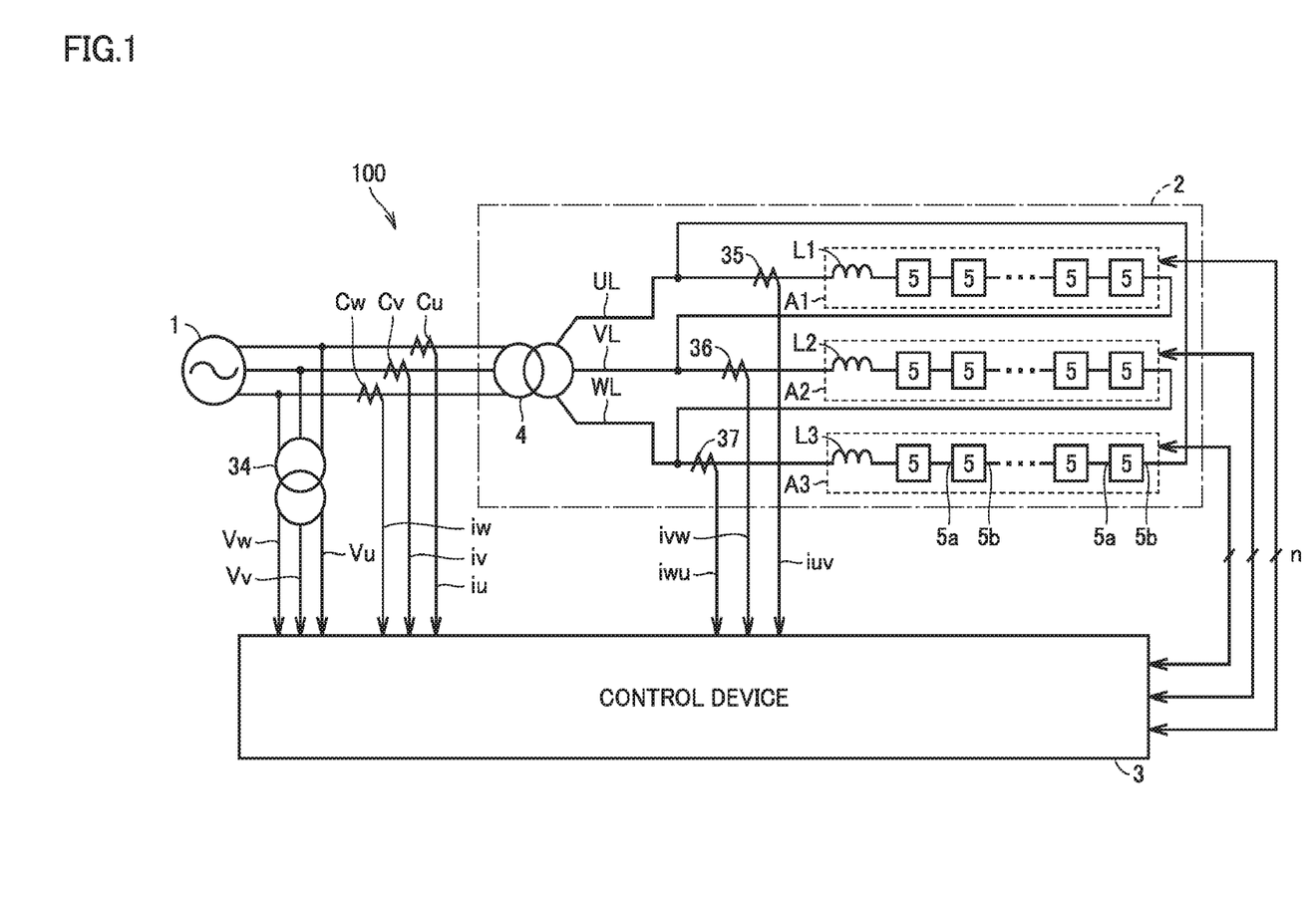
FIG. 1 is a circuit block diagram showing a configuration of a power conversion apparatus according to an embodiment of the present invention.

FIG. 1 is a circuit block diagram showing a configuration of a power conversion apparatus according to an embodiment of the present invention. In FIG. 1, a power conversion apparatus 100 is used as a reactive power compensator to compensate for reactive power of a power system 1.

With reference to FIG. 1, power conversion apparatus 100 includes a modular multilevel conversion device (hereinafter referred to as an MMC) 2, and a control device 3 to control MMC 2.

MMC 2 includes a transformer 4 and three-phase (U, V, W phases) AC lines UL, VL, WL. Transformer 4 includes three primary windings and three secondary windings. Each of the three primary windings is connected to a corresponding one of the three-phase power transmission lines of power system 1. Each of the three secondary windings is connected to one terminal of a corresponding one of AC lines UL, VL, WL.

MMC 2 is configured to inject or absorb reactive power to or from power system 1 via transformer 4. Specifically, when the three-phase AC voltage (hereinafter also referred to as a "system voltage") of power system 1 becomes low, MMC 2 injects reactive power to power system 1 to increase the system voltage. On the other hand, when the system voltage becomes high, MMC 2 absorbs reactive power from power system 1 to decrease the system voltage. MMC 2 can compensate for reactive power by injecting or absorbing a current orthogonal to the system voltage, to or from power system 1.

Thus, when power conversion apparatus 100 is in an ideal state, the active power transferred from power system 1 to MMC 2 is low enough as compared to the reactive power. The ideal state as used herein includes a state in which the power loss in MMC 2 (unit converter 5) is substantially zero, and a state in which the system voltage is in a three-phase equilibrium state.

MMC 2 corresponds to one example of the "power conversion device". Although MMC 2 is connected to power system 1 via transformer 4 in FIG. 1, MMC 2 may be connected to power system 1 via a reactor for interconnection.

MMC 2 further includes arms A1 to A3. Arm A1 is connected between the other terminal of AC line UL and the other terminal of AC line VL. Arm A2 is connected between the other terminal of AC line VL and the other terminal of AC line WL. Arm A3 is connected between the other terminal of AC line WL and the other terminal of AC line UL. That is, arms A1 to A3 are connected in delta connection.

Each of arms A1 to A3 includes a plurality of unit converters 5 (hereinafter also simply referred to as "cells"). Each of the plurality of cells 5 is configured to perform two-way power conversion in accordance with a control signal from control device 3. In the example of FIG. 1, each of arms A1 to A3 includes n (n is an integer of 2 or more) cells 5 connected in series. That is, MMC 2 includes 3n cells 5 in total.

Arm A1 further includes a reactor L1 connected to a plurality of cells 5 in series. Arm A2 further includes a reactor L2 connected to a plurality of cells 5 in series. Arm A3 further includes a reactor L3 connected to a plurality of cells 5 in series. Each of reactors L1 to L3 is provided to reduce a circulating current flowing in the delta connection. The location of each of reactors L1 to L3 is not limited to that shown in FIG. 1, but may be any location if only each of reactors L1 to L3 is connected in series to cells 5 of a corresponding arm. Alternatively, each of reactors L1 to L3 may be distributed in a corresponding one of arms A1 to A3 as a plurality of reactors.

In each of arms A1 to A3, first-stage cell 5 has an output terminal 5a connected to the other terminal of a corresponding one of AC lines UL, VL, WL via a corresponding one of reactors L1 to L3. In each of arms A1 to A3, final-stage cell 5 has an output terminal 5b connected to the other terminal of a corresponding one of AC lines VL, WL, UL. In each arm, each of cells 5 other than first-stage and final-stage cells 5 has output terminal 5a connected to output terminal 5b of previous-stage cell 5, and has output terminal 5b connected to output terminal 5a of subsequent-stage cell 5.

The three-phase power transmission lines of power system 1 have current detectors Cu, Cv, Cw for respectively detecting currents iu, iv, iw (hereinafter also referred to as "output currents") flowing between power system 1 and MMC 2. Further, the power transmission lines have a voltage detector 34 for detecting three-phase AC voltages (hereinafter also referred to as "system voltages") Vu, Vv, Vw of power system 1.

Further, AC line UL has a current detector 35 for detecting a current flowing through arm A1 (hereinafter also referred to as an "arm current iuv"). AC line VL has a current detector 36 for detecting a current flowing through arm A2 (hereinafter also referred to as an "arm current ivw"). AC line WL has a current detector 37 for detecting a current flowing through arm A3 (hereinafter also referred to as an "arm current iwu").

Output currents iu, iv, iw may be calculated based on the detection values of arm currents iuv, ivw, iwu from current detectors 35 to 37, without using current detectors Cu, Cv, Cw. Iu=Iuv−Iwu, Iv=Ivw−Iuv, and Iw=Iwu−Ivw are satisfied.

The detection values from current detectors Cu, Cv, Cw and 35 to 37 and voltage detector 34 are inputted to control device 3. Control device 3 controls the operation of each of arms A1 to A3 (i.e., each of 3n cells 5), using an instruction from a host controller (not shown) and a detection signal or the like inputted from a corresponding detector.

Control device 3 may comprise, for example, a microcomputer. By way of example, control device 3 may include a not-shown memory and control processing unit (CPU) therein, and implement a control operation described below by software processing where the CPU executes a program stored in the memory in advance. Alternatively, the control operation may be implemented by, in part or in whole, hardware processing using a dedicated internal electronic circuit or the like, instead of software processing.

(Configuration of Unit Converter)

Next, a configuration example of cell 5 shown in FIG. 1 is described with reference to FIG. 2.

Figure 2:
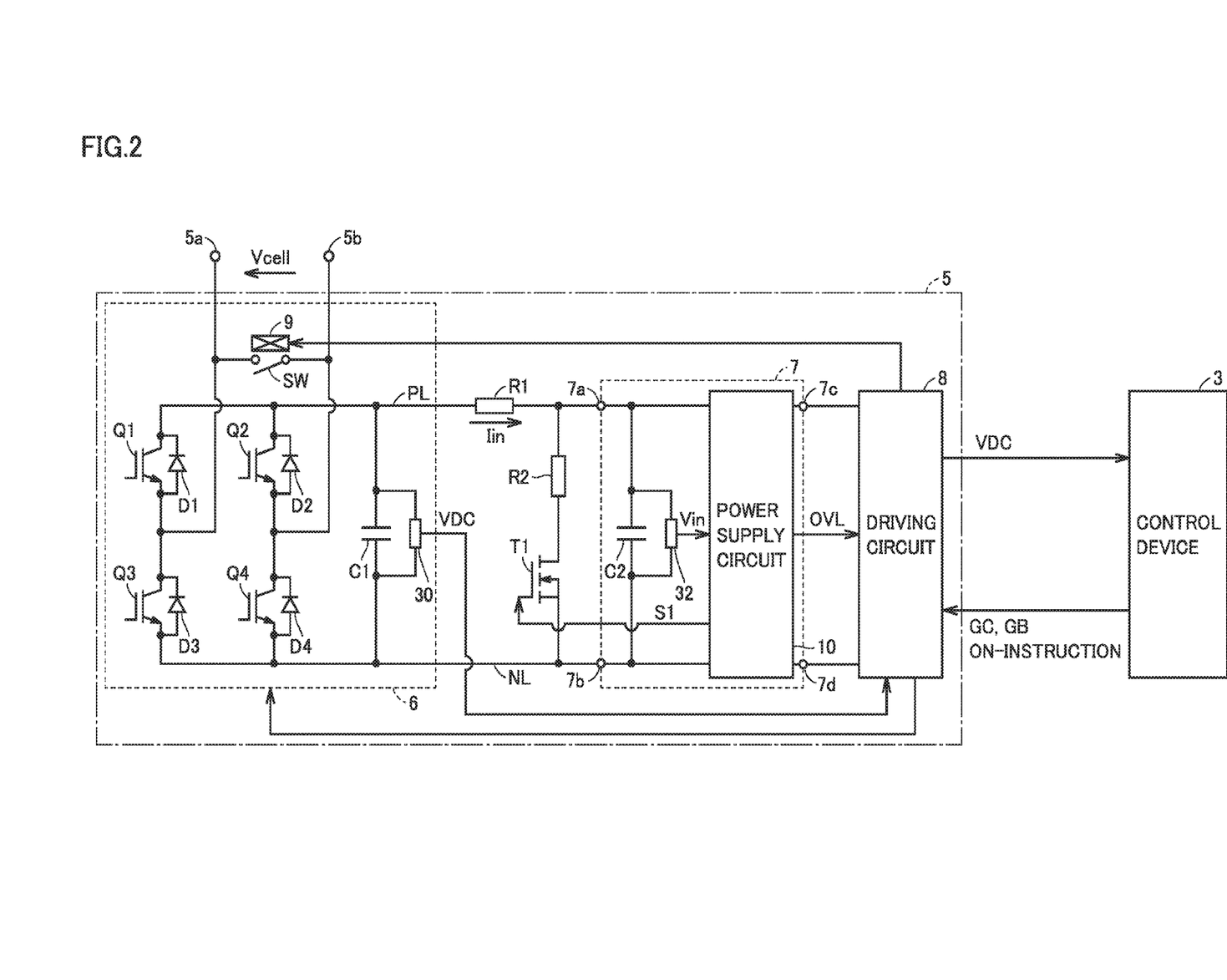

With reference to FIG. 2, cell 5 includes a main circuit 6, a self-feeding circuit 7, a driving circuit 8, resistors R1, R2, and a switching element T1.

Main circuit 6 has a so-called full-bridge configuration. Specifically, main circuit 6 includes output terminals 5a, 5b, switching elements Q1 to Q4, diodes D1 to D4, a DC capacitor C1, a voltage detector 30, and a switch SW.

Switching elements Q1 to Q4 are self-extinguishing power semiconductor elements, such as insulated gate bipolar transistors (IGBTs). Switching elements Q1, Q3 are connected in series between a pair of power lines (positive-electrode line PL and negative-electrode line NL). Switching elements Q2, Q4 are connected in series between the pair of power lines. The collectors of switching elements Q1, Q2 are both connected to positive-electrode line PL, and the emitters of switching elements Q3, Q4 are both connected to negative-electrode line NL. The connection point between the emitter of switching element Q1 and the collector of switching element Q3 is connected to output terminal 5a. The connection point between the emitter of switching element Q2 and the collector of switching element Q4 is connected to output terminal 5b. Diodes D1 to D4 are respectively connected in anti-parallel to switching elements Q1 to Q4.

DC capacitor C1 is connected between positive-electrode line PL and negative-electrode line NL to store DC power. As DC capacitor C1, various types of capacitors, such as an electrolytic capacitor and a film capacitor, may be used. DC capacitor C1 corresponds to one example of the "first electricity storage element".

Voltage detector 30 detects the DC voltage between the terminals of DC capacitor C1 (hereinafter also simply referred to as a "capacitor voltage VDC"), and outputs a signal representing the detected capacitor voltage VDC to driving circuit 8.

Where the voltage at output terminal 5a relative to output terminal 5b in each cell 5 is defined as a "cell voltage Vcell", cell voltage Vcell is controlled in accordance with the on- and off-states of switching elements Q1 to Q4. Cell 5 can switch cell voltage Vcell between +VDC, 0, and −VDC in accordance with the switching operation of switching elements Q1 to Q4.

In MMC 2 shown in FIG. 1, the voltage between the two terminals of each arm A can be expressed as the sum of cell voltages Vcell of n cells 5 included in the arm A. Therefore, the voltage of each arm A can be controlled in accordance with the on- and off-states of switching elements Q1 to Q4 constituting main circuit 6 of each cell 5.

Control device 3 is configured to control the active power to be transmitted and received between power system 1 and MMC 2, and the reactive power to be outputted from MMC 2 to power system 1, by controlling output currents iu, iv, iw of MMC 2. By controlling the active power to be transmitted and received between power system 1 and MMC 2, control device 3 can cause capacitor voltage VDC of DC capacitor C1 of each cell 5 to follow a DC voltage instruction value VDC*. DC voltage instruction value VDC* may be inputted from a host controller (not shown), or may be predetermined at control device 3. By controlling the reactive power to be outputted from MMC 2 to power system 1, control device 3 can stabilize the system voltage.

Specifically, control device 3 generates a cell voltage instruction value Vcell* for controlling cell voltage Vcell of each cell 5 based on arm voltage instruction values Vuv*, Vvw*, Vwu*, capacitor voltage VDC of cell 5, and arm currents iuv, ivw, iwu. In the present embodiment, 3n cell voltage instruction values Vcell* are generated corresponding to 3n cells 5. Control device 3 generates a gate signal GC to provide it to main circuit 6 of each of 3n cells 5, based on a corresponding one of 3n cell voltage instruction values Vcell*.

Referring back to FIG. 2, switch SW is connected between output terminals 5a, 5b. Switch SW is opened (turned off) when corresponding cell 5 is normal, whereas switch SW is closed (turned on) when corresponding cell 5 is malfunctioning. When switch SW is turned on, output terminals 5a, 5b are short-circuited and thus corresponding cell 5 is bypassed. Switch SW corresponds to one example of the "second switch".

Driving circuit 8 is driven by the DC power supplied from self-feeding circuit 7. Driving circuit 8 receives, from control device 3, gate signal GC for controlling the switching operation at the full-bridge circuit of main circuit 6, and a gate breaking signal GB for stopping the switching operation (turning off all the switches) of the full-bridge circuit. Driving circuit 8 controls switching elements Q1 to Q4 on and off in response to gate signal GC. Also, driving circuit 8 fixes switching elements Q1 to Q4 to an off-state in response to gate breaking signal GB.

Further, driving circuit 8 receives, from control device 3, an on-instruction for controlling switch SW on and off. Driving circuit 8 controls switch SW on and off by applying a current to an exciting coil 9 in accordance with the on-instruction. A control configuration of driving circuit 8 will be described later.

Self-feeding circuit 7 is configured to generate a power supply voltage for driving circuit 8 using the power stored in DC capacitor C1 of main circuit 6. That is, self-feeding circuit 7 supplies power from DC capacitor C1 of main circuit 6 to driving circuit 8.

(Configuration of Self-Feeding Circuit)

Figure 3:
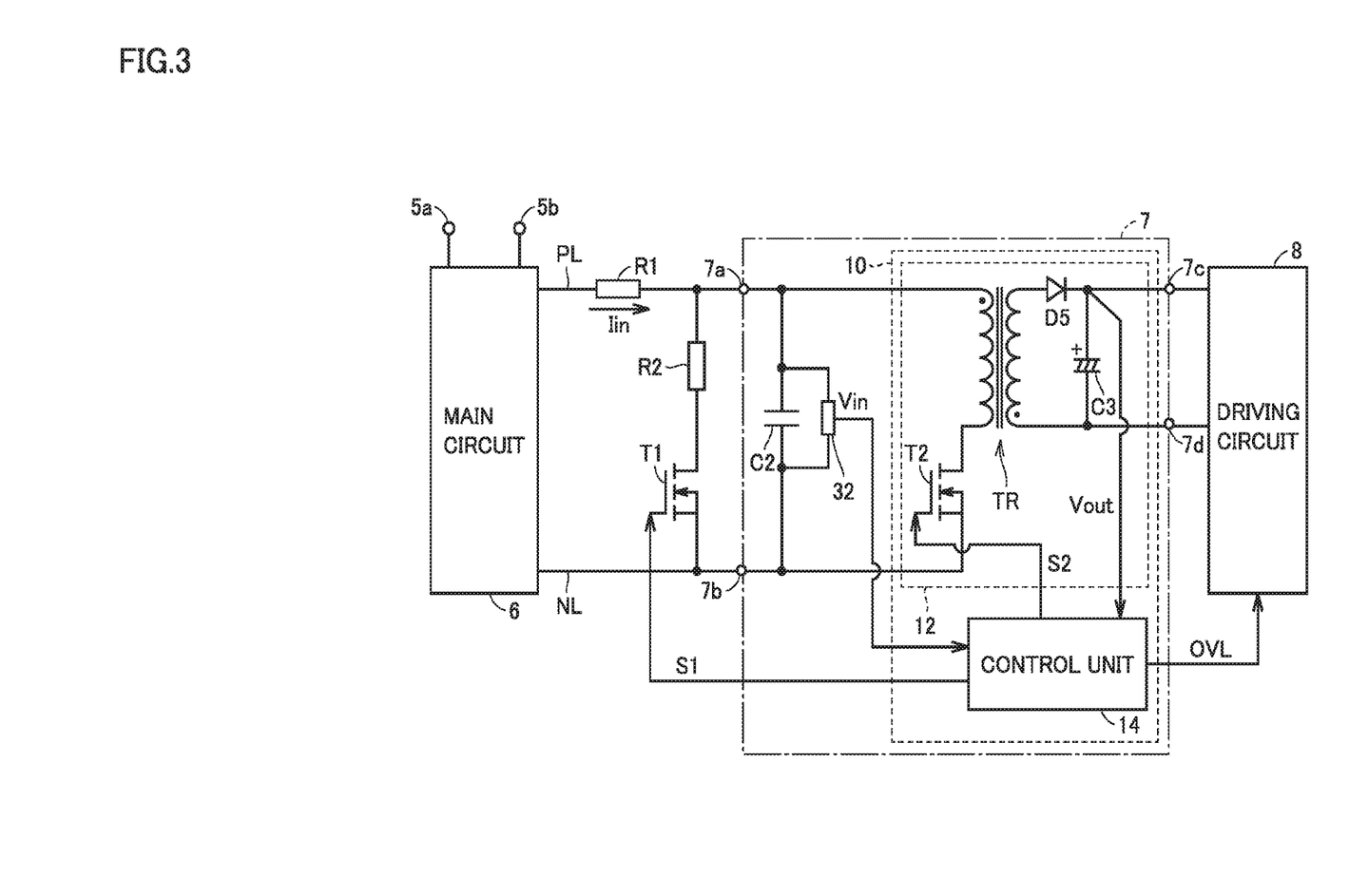
FIG. 3 is a circuit diagram showing a configuration example of the self-feeding circuit shown in FIG. 2.

FIG. 3 is a circuit diagram showing a configuration example of self-feeding circuit 7 shown in FIG. 2. With reference to FIG. 2 and FIG. 3, a configuration example of self-feeding circuit 7 is described.

Self-feeding circuit 7 is connected to resistor R1 electrically in series between positive-electrode line PL and negative-electrode line NL. Self-feeding circuit 7 includes input terminals 7a, 7b, output terminals 7c, 7d, a capacitor C2, a power supply circuit 10, and a voltage detector 32.

Input terminal 7a is connected to one terminal of resistor R1. The other terminal of resistor R1 is connected to positive-electrode line PL. Input terminal 7b is connected to negative-electrode line NL. Output terminals 7c, 7d are connected to driving circuit 8.

Capacitor C2 is connected between input terminals 7a and 7b. In other words, capacitor C2 is connected to resistor R1 electrically in series between positive-electrode line PL and negative-electrode line NL. The series circuit of resistor R1 and capacitor C2 is connected to DC capacitor C1 electrically in parallel. Resistor R1 can serve as a "current limiting resistor" for limiting a current flowing from DC capacitor C1 to capacitor C2. In the following description, a current flowing through resistor R1 is also referred to as an "input current Iin".

Capacitor voltage VDC is stepped down by resistor R1 (current limiting resistor), and the stepped-down voltage is applied to capacitor C2. As capacitor C2, various types of capacitors, such as an electrolytic capacitor and a film capacitor, may be used. Capacitor C2 corresponds to one example of the "second electricity storage element".

Voltage detector 32 detects the DC voltage between the terminals of capacitor C2 (hereinafter also referred to as an "input voltage Vin"), and outputs a signal representing the detected input voltage Vin to power supply circuit 10.

Power supply circuit 10 is connected to capacitor C2 electrically in parallel and is configured to convert input voltage Vin supplied from capacitor C2 into a power supply voltage for driving circuit 8. Specifically, with reference to FIG. 3, power supply circuit 10 includes a DC-DC converter 12 and a control unit 14. DC-DC converter 12 converts the DC voltage (input voltage Vin) between the terminals of capacitor C2 into a voltage required for drive of driving circuit 8, and supplies the converted voltage to driving circuit 8. DC-DC converter 12 can transfer the DC power supplied from capacitor C2 to driving circuit 8.

An insulating DC-DC converter may be used as DC-DC converter 12, for example. The insulating DC-DC converter may be any of known converters, such as flyback converters, forward converters, push-pull converters, half-bridge converters, and full-bridge converters. In the example of FIG. 3, DC-DC converter 12 is a flyback converter. DC-DC converter 12 includes a transformer TR, a switching element T2, a diode D5, and a capacitor C3.

Transformer TR has a primary winding and a secondary winding insulated from each other. Switching element T2 is connected to the primary winding in series. The series circuit of the primary winding and switching element T2 is connected to capacitor C2 in parallel. Switching element T2 may be any self-extinguishing switching element. Switching element T2 is, for example, an N-channel metal oxide field effect transistor (MOSFET).

Switching element T2 is turned on and off in response to a control signal S2 supplied from control unit 14. During an on-period of switching element T2, input voltage Vin is applied to the primary winding. Transformer TR transfers the power, which has been supplied to the primary winding, to the secondary winding.

The secondary winding has one end connected to the anode of diode D5, and the other end connected to output terminal 7d. The cathode of diode D5 is connected to output terminal 7c. Capacitor C3 is connected between output terminals 7c and 7d. Diode D5 and capacitor C3 rectify the energy emitted from the secondary winding into a direct current during an off-period of switching element T2. Thus, DC-DC converter 12 can generate a DC voltage between output terminals 7c and 7d.

Where the output voltage of DC-DC converter 12 is denoted by Vout, the voltage conversion ratio at DC-DC converter 12 is expressed as Vout/Vin. Voltage conversion ratio Vout/Vin is determined by the turn ratio between the primary winding and the secondary winding of transformer TR, and by the duty cycle of switching element T2. The duty cycle of switching element T2 refers to the ratio of the on-period of switching element T2 to the switching period.

Control unit 14 generates control signal S2 for controlling switching element T2 on and off by controlling the duty cycle of switching element T2. Control unit 14 comprises, for example, a microcomputer.

As shown in FIG. 2, resistor R2 and switching element T1 are connected electrically in series between input terminals 7a and 7b of self-feeding circuit 7. Switching element T1 is, for example, an N-channel MOSFET. Switching element T1 has a drain connected to one terminal of resistor R2, and a source connected to negative-electrode line NL. The other terminal of resistor R2 is connected to input terminal 7a of self-feeding circuit 7.

Switching element T1 is controlled on and off in response to a control signal S1 inputted to its gate from control unit 14 of power supply circuit 10. Specifically, when H (logic high) level control signal S1 is inputted from control unit 14, switching element T1 is turned on, so that resistor R2 is connected to capacitor C2 electrically in parallel. On the other hand, when L (logic low) level control signal S1 is inputted from control unit 14, switching element T1 is turned off, so that resistor R2 is electrically separated from capacitor C2. Switching element T1 corresponds to one example of the "first switch". The first switch may be any other type of switch, such as a relay, that can be controlled on and off by power supply circuit 10. A change in connection order of resistor R2 and switching element T1 would still provide an electrically equivalent circuit configuration.

As described later, control unit 14 of power supply circuit 10 is configured to prevent an overcharge of capacitor C2 by controlling switching element T1 on and off based on input voltage Vin detected by voltage detector 32. When switching element T1 is ON, resistor R2 can serve as an "overcharge preventing resistor".

(Control Configuration of Power Supply Circuit)

Next, a control configuration of power supply circuit 10 in self-feeding circuit 7 is described. In the following, the overcharge preventing function of capacitor C2 included in power supply circuit 10 is described.

Figure 4:
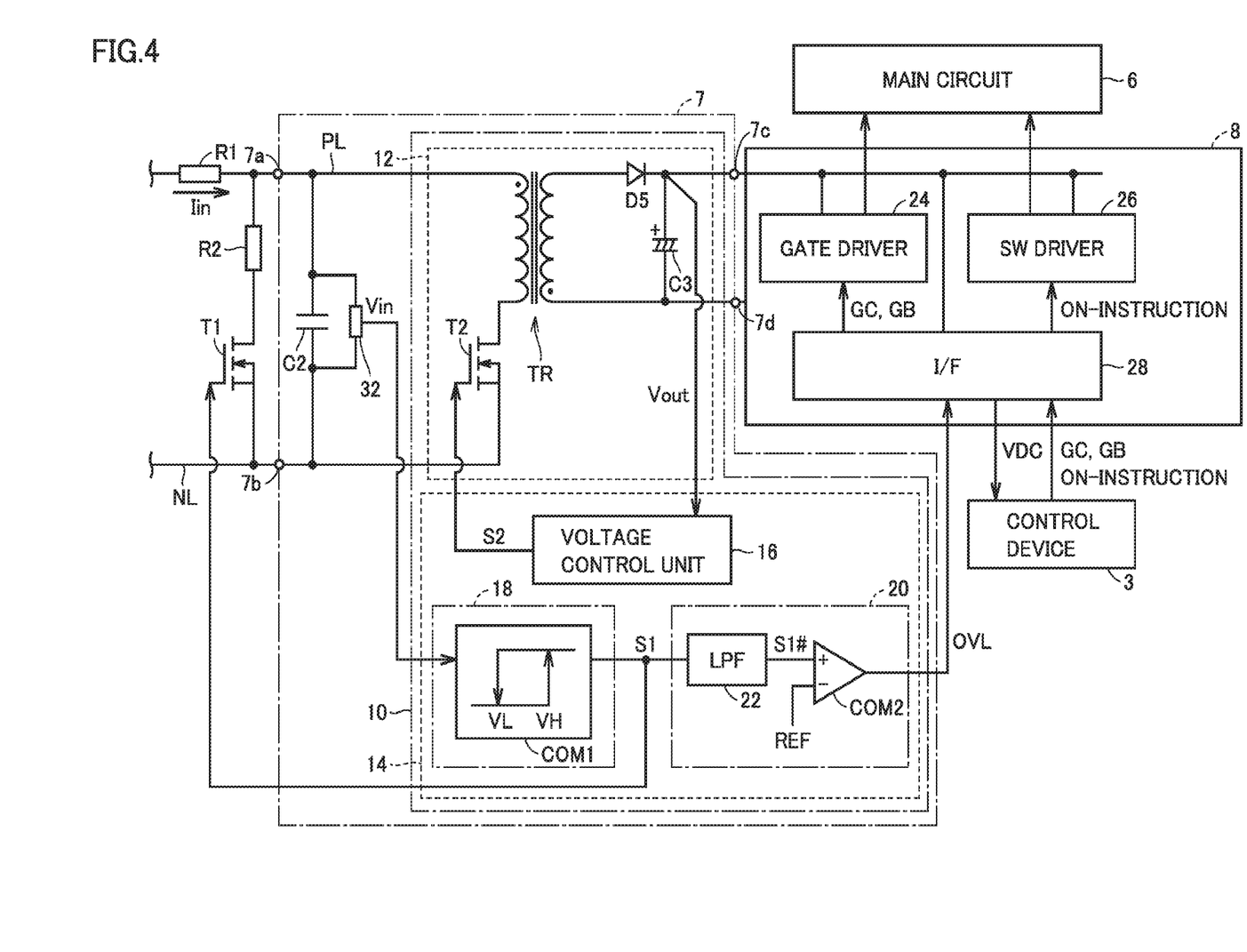
FIG. 4 is a block diagram showing a control configuration of the control unit of the power supply circuit shown in FIG. 3.

FIG. 4 is a block diagram showing a control configuration of control unit 14 of power supply circuit 10 shown in FIG. 3. With reference to FIG. 4, control unit 14 includes a voltage control unit 16 and an overcharge preventing circuit 18.

Voltage control unit 16 controls DC-DC converter 12. Voltage control unit 16 controls the duty cycle of switching element T2. Voltage control unit 16 generates control signal S2 for controlling switching element T2 on and off, and outputs the generated control signal S2 to the gate of switching element T2.

Overcharge preventing circuit 18 is configured to prevent an overcharge of capacitor C2 by controlling switching element T1 on and off based on input voltage Vin detected by voltage detector 32. Specifically, overcharge preventing circuit 18 includes a comparator COM1. Comparator COM1 compares input voltage Vin detected by voltage detector 32 with predetermined threshold values VH, VL, and outputs a signal representing the comparison result. The output signal from comparator COM1 is provided to the gate of switching element T1 as control signal S1.

More specifically, at comparator COM1, threshold value VH is set to a voltage value higher than threshold value VL (VH>VL). When input voltage Vin is higher than threshold value VH, comparator COM1 outputs H-level control signal S1. When input voltage Vin is lower than threshold value VL, comparator COM1 outputs L-level control signal S1. Comparator COM1 has hysteresis. Threshold value VH corresponds to the "first threshold value", and threshold value VL corresponds to the "second threshold value".

With such a configuration, when input voltage Vin becomes higher than threshold value VH, control signal S1 transitions from the L level to the H level, thus causing switching element T1 to be turned on. When input voltage Vin becomes lower than threshold value VL, control signal S1 transitions from the H level to the L level, thus causing switching element T1 to be turned off.

Figure 5:
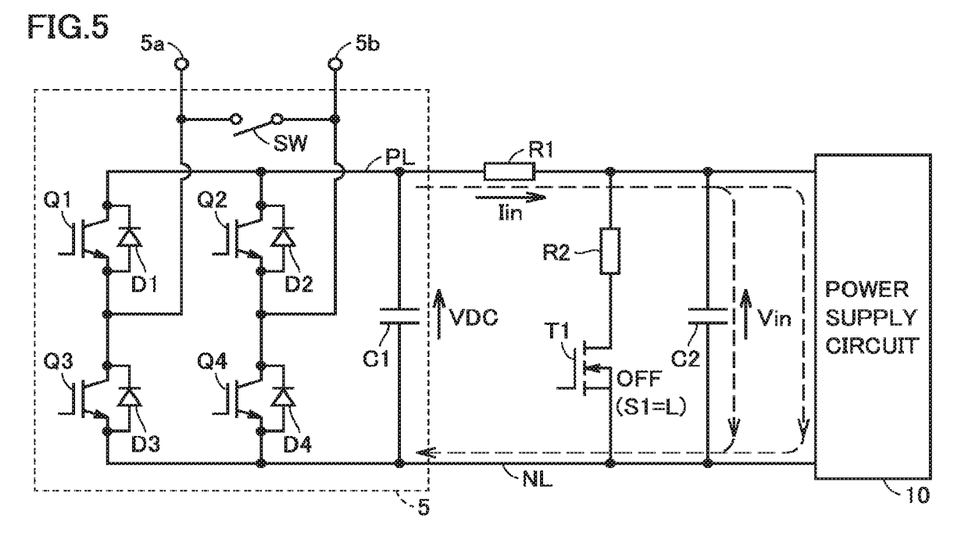
FIG. 5 is a diagram schematically showing a current path at a time when a switching element T1 is in an off-state.

FIG. 5 is a diagram schematically showing a current path at a time when switching element T1 is in an off-state. With reference to FIG. 5, when switching element T1 is in an off-state, resistor R2 (overcharge preventing resistor) is electrically separated from capacitor C2. Accordingly, as indicated by the broken line arrows in the drawing, a current flows from DC capacitor C1 via resistor R1 (current limiting resistor) to capacitor C2. Where the electrical resistance value of resistor R1 is denoted by R1, input current Iin is given by the following formula (1).

$$Iin=(VDC-Vin)/R1 \tag{1}$$

The voltage (input voltage Vin) of capacitor C2 is converted by DC-DC converter 12 of power supply circuit 10 into a voltage required for drive of driving circuit 8, and the converted voltage is supplied to driving circuit 8.

In cell 5, in order to stably supply power to driving circuit 8 during operation of main circuit 6, the demand-and-supply balance of power is determined so that the power supplied from main circuit 6 to self-feeding circuit 7 is greater than the power supplied from self-feeding circuit 7 to driving circuit 8. Accordingly, at capacitor C2, the charging power from DC capacitor C1 exceeds the discharging power to driving circuit 8, thus causing input voltage Vin to gradually increase. When input voltage Vin detected by voltage detector 32 becomes higher than threshold value VH (first threshold value), overcharge preventing circuit 18 outputs H-level control signal S1 to turn on switching element T1, so that resistor R2 (overcharge preventing resistor) is connected to capacitor C2 electrically in parallel for preventing an overcharge of capacitor C2.

Figure 6:
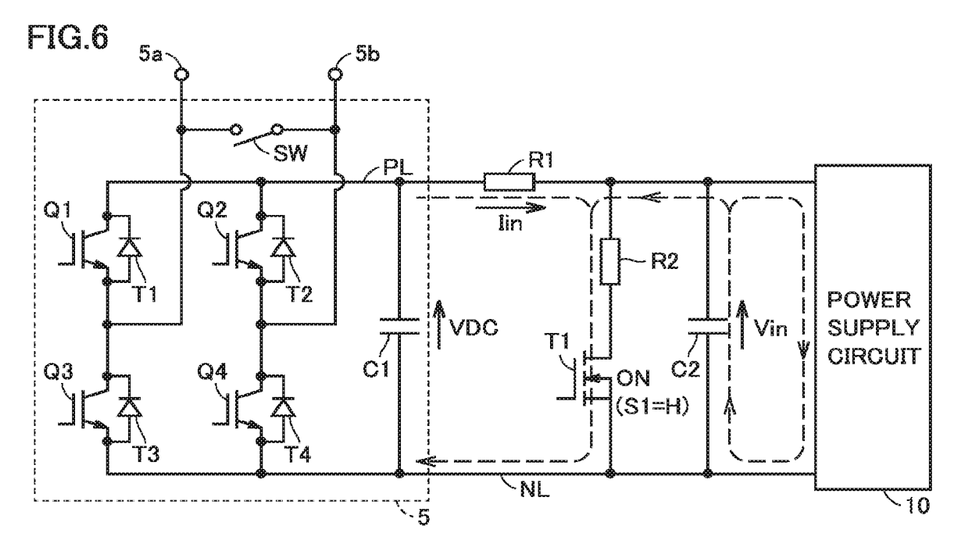
FIG. 6 is a diagram schematically showing a current path at a time when switching element T1 is in an on-state.

FIG. 6 is a diagram schematically showing a current path at a time when switching element T1 is in an on-state. With reference to FIG. 6, when switching element T1 is turned on, a current flows from DC capacitor C1 via resistor R1 (current limiting resistor) and resistor R2 (overcharge preventing resistor), as indicated by the broken line arrows in the drawing.

The voltage (input voltage Vin) of capacitor C2 is converted by DC-DC converter 12 of power supply circuit 10 into a voltage required for drive of driving circuit 8, and the converted voltage is supplied to driving circuit 8.

Figure 7:
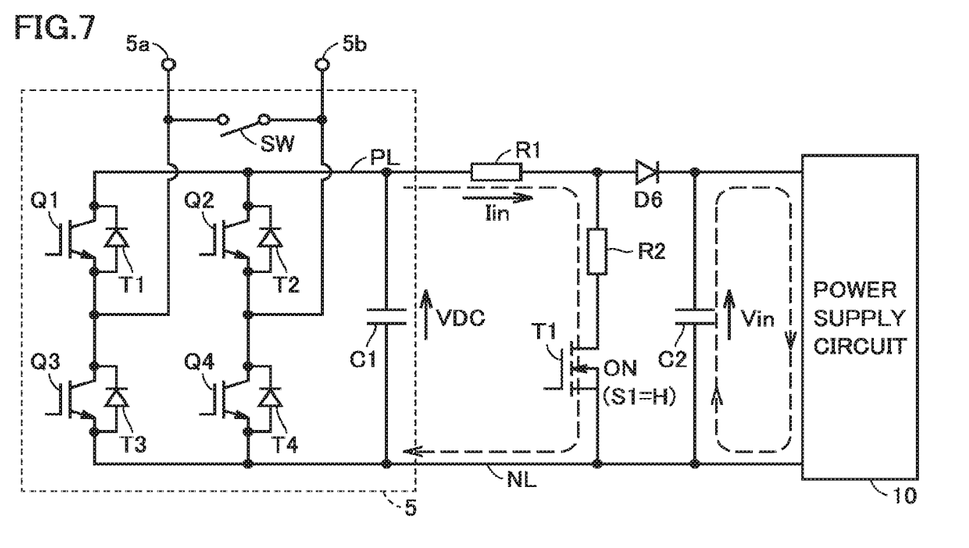
FIG. 7 is a circuit diagram showing another configuration example of the self-feeding circuit shown in FIG. 2.

The electrical resistance value R2 of resistor R2 is selected in such a manner that the current flowing through resistor R2 is greater than input current Iin when resistor R2 is connected. Thus, power supply to capacitor C2 can be stopped. However, the electric charge stored in capacitor C2 flows backward from capacitor C2 to resistor R2. So, as shown in FIG. 7, a diode D6 for preventing the backward flow may be further included. Diode D6 has an anode electrically connected to one terminal of resistor R2, and a cathode electrically connected to one terminal of capacitor C2. This allows stable power supply from self-feeding circuit 7 to driving circuit 8 even when switching element T1 is ON.

In the state of FIG. 6 or FIG. 7, when input voltage Vin gradually decreases and the detection value of input voltage Vin from voltage detector 32 becomes lower than threshold value VL, overcharge preventing circuit 18 outputs L-level control signal S1 to turn off switching element T1. Thus, the current path shown in FIG. 5 is formed again. Capacitor C2 is charged again with the surplus power, i.e., the difference between the charging power from DC capacitor C1 and the discharging power to driving circuit 8. This causes input voltage Vin to start increasing.

In this way, overcharge preventing circuit 18 alternately repeats the state of FIG. 5 (switching element T1 is OFF) and the state of FIG. 6 (switching element T1 is ON) based on the detection value of input voltage Vin from voltage detector 32. Thus, power supply circuit 10 can supply power to driving circuit 8 while preventing an overcharge of capacitor C2.

In the above-described configuration, however, resistor R1 (current limiting resistor) may damage and reduce its resistance value. For example, in the case of resistor R1 composed of a series circuit of a plurality of resistive elements, when at least one of the plurality of resistive elements is short-circuited, the electrical resistance value of the entire series circuit will decrease. The decrease in electrical resistance value of resistor R1 will cause input current Iin to increase.

Figure 8:
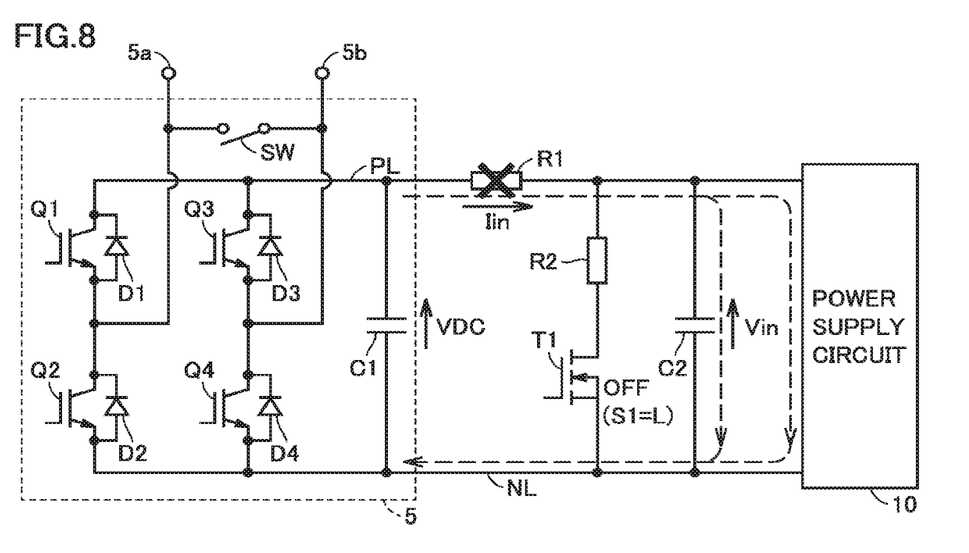
FIG. 8 is a diagram schematically showing a current path at a time when switching element T1 is in an off-state.

FIG. 8 is a diagram schematically showing a current path at a time when switching element T1 is in an off-state. With reference to FIG. 8, when resistor R1 malfunctions and thus reduces its electrical resistance value R1, input current Iin increases in accordance with formula (1). The increase in input current Iin will cause the rate of rise in input voltage Vin to increase. Accordingly, input voltage Vin will reach threshold value VH in a shorter time than in FIG. 5. When input voltage Vin detected by voltage detector 32 becomes higher than threshold value VH, overcharge preventing circuit 18 turns on switching element T1.

Figure 9:
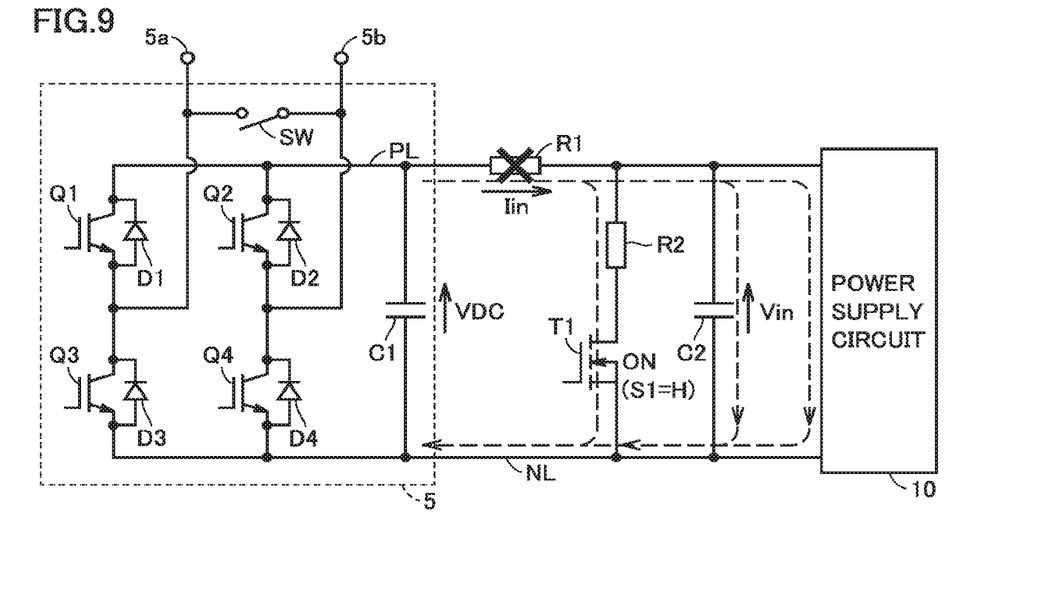
FIG. 9 is a diagram schematically showing a current path at a time when switching element T1 is in an on-state.

FIG. 9 is a diagram schematically showing a current path at a time when switching element T1 is in an on-state. With reference to FIG. 9, when switching element T1 is turned on, a current flows from DC capacitor C1 via resistors R1, R2. Thus, input current Iin increases.

However, due to the decreased electrical resistance value of resistor R1, the voltage of capacitor C2 may become higher than threshold value VH even with resistor R2 connected. In this case, power supply to capacitor C2 continues after switching element T1 is turned on. Therefore, the rate of decline in input voltage Vin is lower than in FIG. 6. As a result, reaching threshold value VL requires a longer time.

Overcharge preventing circuit 18 alternately repeats the state of FIG. 8 (switching element T1 is OFF) and the state of FIG. 9 (switching element T1 is ON) based on the detection value of input voltage Vin from voltage detector 32. Thus, power supply circuit 10 can supply power to driving circuit 8 while preventing an overcharge of capacitor C2, even when resistor R1 is malfunctioning.

However, when switching element T1 is ON (see FIG. 9), the decreased electrical resistance value of resistor R1 causes an increased current to flow through resistor R2 (overcharge preventing resistor), as compared to FIG. 6. A smaller electrical resistance value of resistor R1 causes a larger current flowing through resistor R2 and a larger power consumption at resistor R2, thus possibly bringing resistor R2 into an overloaded state.

In the actual settings, the loss consumable at resistor R2 and the allowable temperature are specified. As used herein, the term an "overloaded state of resistor R2" refers to a state in which the loss consumed at resistor R2 and the temperature of resistor R2 respectively exceed the specified loss and allowable temperature. If the overloaded state continues, resistor R2 may be overheated by Joule's heat and thus damaged. Therefore, in order to prevent overheat of resistor R2, the operation of cell 5 needs to be stopped by quickly sensing the overloaded state of resistor R2.

The magnitude of input current Iin differs between when resistor R1 is normal and when resistor R1 is malfunctioning. Therefore, the change in input voltage Vin with time also differs between them. As a result, the on-off control of switching element T1 in overcharge preventing circuit 18 also differs between them.

In view of this, in the present embodiment, power supply circuit 10 is configured to sense an overloaded state of resistor R2 (overcharge preventing resistor) based on control signal S1 for switching element T1 generated by overcharge preventing circuit 18. Specifically, with reference to FIG. 4, control unit 14 of power supply circuit 10 further includes an overload sensing circuit 20. Overload sensing circuit 20 includes a low pass filter (LPF) 22 and a comparator COM2.

LPF 22 comprises a capacitive element and a resistive element, for example. LPF 22 generates a signal S1 # by averaging control signal S1 generated by overcharge preventing circuit 18. LPF 22 corresponds to one example of the "smoothing circuit".

Comparator COM2 compares output signal S1 # of LPF 22 with a reference value REF. Comparator COM2 compares signal S1 # with reference value REF, and generates a sensing signal OVL in accordance with the comparison result. Specifically, when signal S1 # is higher than reference value REF, comparator COM2 generates H-level sensing signal OVL. On the other hand, when signal S1 # is lower than reference value REF, comparator COM2 generates L-level sensing signal OVL.

Figure 10:
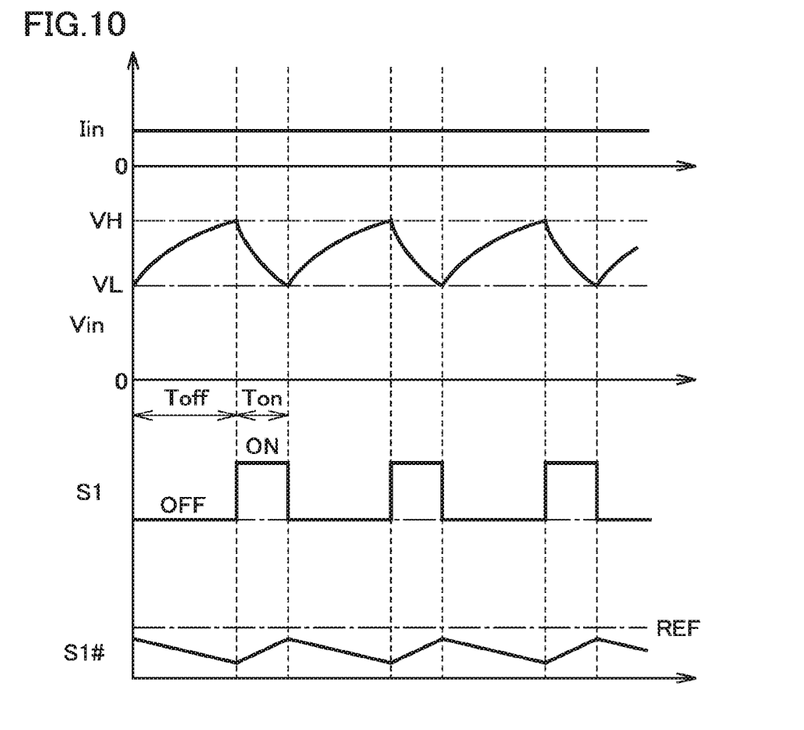
FIG. 10 is a timing chart for explaining the operations of an overcharge preventing circuit and an overload sensing circuit at a time when a resistor R1 is normal.
Figure 11:
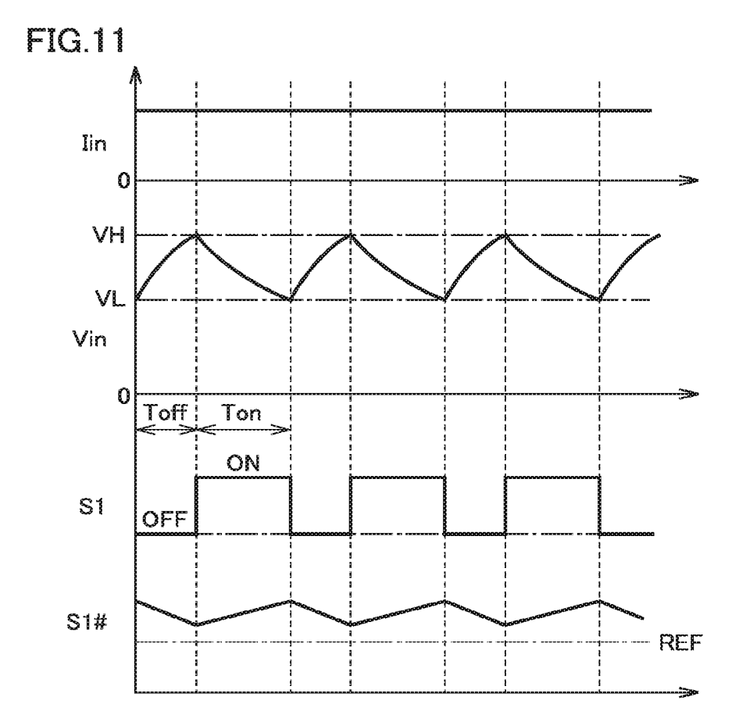
FIG. 11 is a timing chart for explaining the operations of the overcharge preventing circuit and the overload sensing circuit at a time when resistor R1 is malfunctioning.

With reference to FIG. 10 and FIG. 11, the operation of overload sensing circuit 20 is hereinafter described.

FIG. 10 is a timing chart for explaining the operations of overcharge preventing circuit 18 and overload sensing circuit 20 at a time when resistor R1 is normal. FIG. 10 shows the wave forms of input current Iin, input voltage Vin, control signal S1, and output signal S1 # of LPF 22.

Overcharge preventing circuit 18 compares the detection value of input voltage Vin from voltage detector 32 with threshold values VH, VL, and generates control signal S1 in accordance with the comparison result. Control signal S1 is a pulse signal that rises to the H level when input voltage Vin is higher than threshold value VH, and falls to the L level when input voltage Vin is lower than threshold value VL.

Where the duration of H-level control signal S1, i.e., the on-time of switching element T1, is denoted by Ton, the off-time of switching element T1 is denoted by Toff, and the switching period of switching element T1 is denoted by T (=Ton+Toff), the ratio (Ton/T) of on-time Ton to switching period T corresponds to the duty cycle DR of control signal S1.

Signal S1 #, the averaged control signal S1, has a wave form including ripple, and its average value can be obtained by multiplying the amplitude of control signal S1 by duty cycle DR. For the sake of simplicity, the amplitude of control signal S1 is hereinafter described as "1". That is, the magnitude of signal S1 # is equal to duty cycle DR of control signal S1.

FIG. 11 is a timing chart for explaining the operations of overcharge preventing circuit 18 and overload sensing circuit 20 at a time when resistor R1 is malfunctioning. FIG. 11 shows the wave forms of input current Iin, input voltage Vin, control signal S1 and output signal S1 # of LPF 22.

Similar to FIG. 10, control signal S1 is a pulse signal in FIG. 11. However, duty cycle DR of control signal S1 in FIG. 11 is different from that in FIG. 10.

As described in FIG. 8, when resistor R1 malfunctions and thus reduces its electrical resistance value, input current Iin increases. Therefore, the rate of rise in input voltage Vin increases when control signal S1 is at the L level (when switching element T1 is OFF). Accordingly, input voltage Vin will reach threshold value VH in a shorter time than in FIG. 10. As a result, the duration of L-level control signal S1, i.e., off-time Toff of switching element T1, becomes shorter than in FIG. 10.

Also, as described in FIG. 9, when control signal S1 is at the H level (when switching element T1 is ON), power supply to capacitor C2 continues, thus decreasing the rate of decline in input voltage Vin. Accordingly, input voltage Vin will reach threshold value VL in a longer time than in FIG. 10. As a result, the duration of H-level control signal S1, i.e., on-time Ton of switching element T1, becomes longer than in FIG. 10.

Thus, control signal S1 has a shorter off-time Toff and a longer on-time Ton when resistor R1 is malfunctioning than when resistor R1 is normal. Therefore, duty cycle DR of control signal S1 tends to be greater than in FIG. 10. As a result, signal S1 #, the averaged control signal S1, is also higher than signal S1 # in FIG. 10.

According to this, if reference value REF is set higher than signal S1 # at a time when resistor R1 is normal and lower than signal S1 # at a time when resistor R1 is malfunctioning, an overloaded state of resistor R2 can be sensed by comparing signal S1 # with reference value REF. Therefore, reference value REF is set to correspond to a duty cycle higher than duty cycle DR of control signal S1 at a time when resistor R1 is normal, and lower than duty cycle DR of control signal S1 at a time when resistor R1 is malfunctioning.

In the example of FIG. 10, signal S1 # is lower than reference value REF, that is, duty cycle DR of control signal S1 is lower than reference value REF. Therefore, overload sensing circuit 20 determines that resistor R2 is not in an overloaded state, and thus outputs L-level sensing signal OVL.

On the other hand, in the example of FIG. 11, signal S1 # is higher than reference value REF, that is, duty cycle DR of control signal S1 is higher than reference value REF. Therefore, overload sensing circuit 20 determines that resistor R2 is in an overloaded state, and thus outputs H-level sensing signal OVL.

Referring back to FIG. 4, when sensing an overloaded state of resistor R2, overload sensing circuit 20 generates H-level sensing signal OVL and outputs it to driving circuit 8. Driving circuit 8 includes a gate driver 24, a SW driver 26, and an interface (I/F) circuit 28.

I/F circuit 28 communicates with control device 3 via an optical fiber cable (not shown). I/F circuit 28 receives, from control device 3, gate signal GC for controlling the full-bridge circuit of main circuit 6. I/F circuit 28 also receives, from control device 3, gate breaking signal GB for stopping the switching operation of (turning off all of) switching elements Q1 to Q4 constituting the full-bridge circuit. I/F circuit 28 outputs the received gate signal GC and gate breaking signal GB to gate driver 24.

Gate driver 24 controls switching elements Q1 to Q4 on and off in response to gate signal GC, or fixes switching elements Q1 to Q4 to an off-state (stop state) in response to gate breaking signal GB.

SW driver 26 is a circuit for controlling switch SW on and off. SW driver 26 controls application of a current to exciting coil 9 (see FIG. 2) for switch SW in response to an on-instruction from control device 3. When a current is not applied to exciting coil 9, switch SW is OFF. During a normal operation, application of a current to exciting coil 9 is stopped and switch SW is OFF. On the other hand, when control device 3 senses a malfunction of any of a plurality of cells 5, control device 3 outputs an on-instruction to the malfunctioning cell 5. In the malfunctioning cell 5, I/F circuit 28 receives the on-instruction and outputs it to SW driver 26. In response to the on-instruction, a current is applied to exciting coil 9 to turn on switch SW, thus short-circuiting the output of the malfunctioning cell 5.

When OF circuit 28 receives H-level sensing signal OVL from overload sensing circuit 20, OF circuit 28 outputs sensing signal OVL to SW driver 26 and gate driver 24. When SW driver 26 receives H-level sensing signal OVL, SW driver 26 turns on switch SW so that its cell 5 is bypassed. When gate driver 24 receives H-level sensing signal OVL, gate driver 24 fixes switching elements Q1 to Q4 to an off-state by breaking the gate signal for the full-bridge circuit of main circuit 6.

Figure 12:
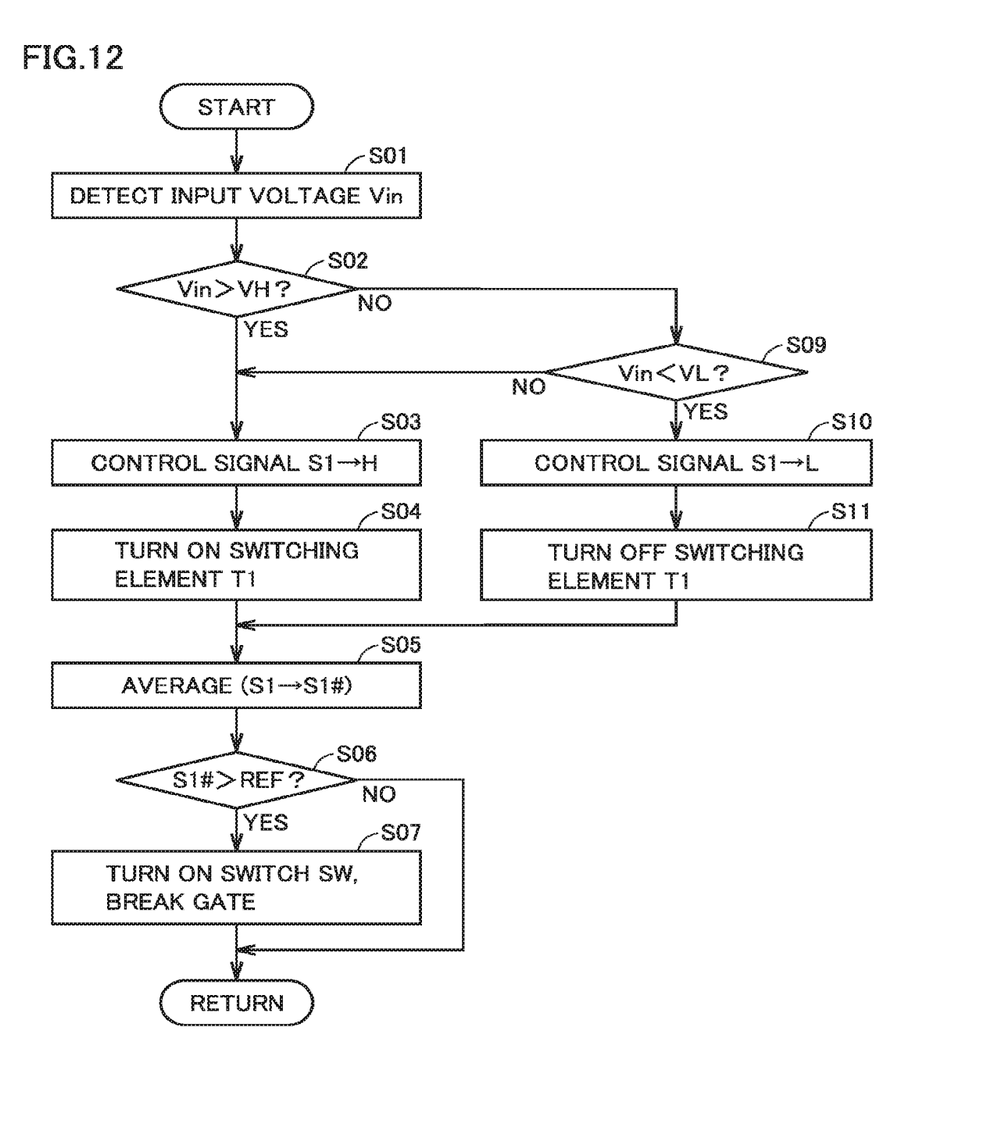
FIG. 12 is a flowchart for explaining a control process of a power supply circuit in a self-feeding circuit.

FIG. 12 is a flowchart for explaining a control process of power supply circuit 10 in self-feeding circuit 7. The control process shown in FIG. 12 executed by power supply circuit 10 enables each cell 5 to implement the function of preventing an overcharge of capacitor C2 and the function of sensing an overload on resistor R2 described above.

With reference to FIG. 12, when power supply circuit 10 acquires the detection value of input voltage Vin from voltage detector 32 by step S01, power supply circuit 10 determines whether or not the detection value of input voltage Vin is higher than threshold value VH (first threshold value) by step S02. When the detection value of input voltage Vin is higher than threshold value VH (YES at S02), power supply circuit 10 generates H-level control signal S1 by step S03. Thus, at step SO4, switching element T1 is turned on to form the current path shown in FIG. 6.

On the other hand, when the detection value of input voltage Vin is equal to or less than threshold value VH (NO at S02), power supply circuit 10 further determines, by step S09, whether or not the detection value of input voltage Vin is lower than threshold value VL (second threshold value). When the detection value of input voltage Vin is equal to or more than threshold value VL (NO at S09), power supply circuit 10 goes on to step S03 to generate H-level control signal S1. Thus, at step SO4, switching element T1 is turned on.

On the other hand, when the detection value of input voltage Vin is less than threshold value VL (YES at S09), power supply circuit 10 generates L-level control signal S1 by step S10. Thus, at step S11, switching element T1 is turned on to form the current path shown in FIG. 5.

Next, power supply circuit 10 goes on to step S05 to generate signal S1 # by averaging control signal S1 using a smoothing circuit (LPF 22). Power supply circuit 10 compares signal S1 # with reference value REF by step S06.

When signal S1 # is higher than reference value REF (YES at S06), power supply circuit 10 determines that resistor R2 is in an overloaded state, and generates H-level sensing signal OVL. When driving circuit 8 receives H-level sensing signal OVL from power supply circuit 10, driving circuit 8 turns on switch SW by step S07 so that its cell 5 is bypassed. Driving circuit 8 fixes switching elements Q1 to Q4 to an off-state by breaking the gate signal for the full-bridge circuit of main circuit 6.

In such a power conversion apparatus according to the present embodiment, each cell 5 includes self-feeding circuit 7 to supply power from DC capacitor C1 of main circuit 6 to driving circuit 8. This self-feeding circuit 7 includes capacitor C2 connected to resistor R1 (current limiting resistor) electrically in series between the terminals of DC capacitor C1, and is configured to convert the voltage (input voltage Vin) of capacitor C2 into a power supply voltage for driving circuit 8. Between the terminals of capacitor C2, resistor R2 (overcharge preventing resistor) and switching element T1 (first switch) are connected electrically in series. Self-feeding circuit 7 is configured to prevent an overcharge of capacitor C2 by controlling switching element T1 on and off based on the detection value of the voltage of capacitor C2. Self-feeding circuit 7 is further configured to sense an overloaded state of resistor R2 based on control signal S1 for controlling switching element T1 on and off.

According to this, an overloaded state of resistor R2 can be sensed using control signal S1 for controlling the on-off operation of switching element T1 which is connected in series to resistor R2 for preventing an overcharge of capacitor C2. Therefore, resistor R2 can be prevented from being overheated and damaged by, for example, malfunction of resistor R1.

Further, since an overloaded state of resistor R2 can be sensed using control signal S1, a reliable power conversion apparatus with a simple structure can be provided without needing, for example, a temperature sensor for sensing the temperature of resistor R2.

It should be understood that the embodiment disclosed herein is by way of example in every respect, not by way of limitation. The scope of the present invention is defined not by the above description but by the terms of the claims, and is intended to include any modification within the meaning and scope equivalent to the terms of the claims.

REFERENCE SIGNS LIST

1: power system; 2: MMC; 3: control device; 4: transformer; 5: unit converter (cell); 6: main circuit; 7: self-feeding circuit; 7*a*, 7*b*: input terminal; 5*a*, 5*b*, 7*c*, 7*d*: output terminal; 8: driving circuit; 9: exciting coil; 10: power supply circuit; 12: DC-DC converter; 14: control unit; 16: voltage control unit; 18: overcharge preventing circuit; 20: overload sensing circuit; 24: gate driver; 26: SW driver; 28: OF circuit; 30, 32, 34: voltage detector; 35 to 37, Cu, Cv, Cw: current detector; 100: power conversion apparatus; PL: positive-electrode line; NL: negative-electrode line; Q1 to Q4, T1, T2: switching element; C1 to C3: capacitor; D1 to D6: diode; R1, R2: resistor; COM1, COM2: comparator; REF: reference value; VH, VL: threshold value; TR: transformer; Vin: input voltage; Iin: input current; SW: switch; VDC: capacitor voltage; Vcell: cell voltage

The invention claimed is:

1. A power conversion apparatus comprising:
    a power conversion device including at least one unit converter; and
    a control device configured to control the power conversion device,
    the unit converter including:
        a main circuit including a first electricity storage element and a plurality of switching elements, a driving circuit configured to drive the plurality of switching elements, and a self-feeding circuit configured to supply power from the first electricity storage element to the driving circuit, the self-feeding circuit including:

a second electricity storage element electrically connected between terminals of the first electricity storage element, a power supply circuit configured to convert a voltage of the second electricity storage element into a power supply voltage for the driving circuit, and a voltage detector configured to detect the voltage of the second electricity storage element, the unit converter further including:

a first resistor electrically connected in series to the second electricity storage element wherein the series connection is directly connected in parallel with the first electricity storage element, a second resistor electrically connected between terminals of the second electricity storage element, and a first switch electrically connected in series to the second resistor wherein the series connection is directly connected in parallel with the second electricity storage element, the power supply circuit including:

an overcharge preventing circuit configured to prevent an overcharge of the second electricity storage element by generating a control signal for controlling the first switch on and off based on a detection value from the voltage detector, and an overload sensing circuit configured to sense an overloaded state of the second resistor based on the control signal generated by the overcharge preventing circuit.

2. The power conversion apparatus according to claim 1, wherein the overcharge preventing circuit is configured to generate the control signal so that the first switch is turned on when the detection value from the voltage detector becomes higher than a first threshold value, and so that the first switch is turned off when the detection value becomes lower than a second threshold value, the second threshold value being lower than the first threshold value, and the overload sensing circuit is configured to sense the overloaded state of the second resistor based on a duty cycle of the control signal.

3. The power conversion apparatus according to claim 2, wherein the overload sensing circuit is configured to sense the overloaded state of the second resistor when a magnitude of a signal obtained by smoothing the control signal is greater than a predetermined reference value.

4. The power conversion apparatus according to claim 3, wherein the reference value is set to correspond to a duty cycle higher than a duty cycle of the control signal at a time when the first resistor is normal, and lower than a duty cycle of the control signal at a time when the first resistor is malfunctioning.

5. The power conversion apparatus according to claim 1, further comprising an arm including a plurality of the unit converters connected in series, wherein each of the unit converters further includes a second switch configured to be turned on to short-circuit output terminals of the main circuit, in response to an on-instruction from the control device, and the driving circuit is configured to turn on the second switch when the overloaded state of the second resistor is sensed.

6. The power conversion apparatus according to claim 5, wherein the driving circuit is configured to, when the overloaded state of the second resistor is sensed, bring the main circuit into a gate block state in which the plurality of switching elements are fixed to an off-state.

* * * * *